United States Patent [19]

Hombek et al.

[11] Patent Number: 5,446,105

[45] Date of Patent: Aug. 29, 1995

[54] FUNCTIONALIZED COPOLYMER OF HIGHER α-OLEFIN AND UNSATURATED DICARBOXYLIC ACID ESTER AND DERIVATIVES THEREOF

[75] Inventors: Richard Hombek, Ontario, Canada; Ross C. Opsahl, Geneva, Ill.; Theodore A. Marolewski, New City, N.Y.

[73] Assignee: Akzo Nobel N.V., Arnhem, Netherlands

[21] Appl. No.: 198,739

[22] Filed: Feb. 18, 1994

[51] Int. Cl.⁶ ............... C08F 222/04; C08F 222/10
[52] U.S. Cl. ............... 525/327.6; 525/329.6; 525/379; 525/380
[58] Field of Search ............... 525/327.6, 329.6

[56] References Cited

U.S. PATENT DOCUMENTS

| | | | |
|---|---|---|---|
| 2,543,964 | 3/1951 | Giammaria | 252/56 |
| 2,615,845 | 10/1952 | Lippincott et al. | 252/56 |
| 3,304,261 | 2/1967 | Ilnyckyi et al. | 252/56 |
| 3,314,908 | 4/1967 | Kagan et al. | 260/29.6 |
| 4,121,026 | 10/1978 | Cheng et al. | 526/15 |
| 4,732,942 | 3/1988 | Liu et al. | 525/301 |
| 4,790,948 | 12/1988 | Liu et al. | 252/47.5 |
| 4,812,261 | 3/1989 | Liu et al. | 252/51.5 |
| 4,826,613 | 5/1989 | Hart et al. | 252/52 R |
| 4,842,756 | 6/1989 | Liu et al. | 252/48.2 |
| 4,931,197 | 6/1990 | Beck et al. | 252/56 R |
| 5,110,491 | 5/1992 | Derosa et al. | 252/47.5 |
| 5,176,841 | 5/1993 | Wallfahrer | 252/56 D |
| 5,274,102 | 12/1993 | Marolewski et al. | 548/142 |

FOREIGN PATENT DOCUMENTS

| | | | |
|---|---|---|---|
| 1238448 | 6/1988 | Canada | C08F 218/14 |
| 59-025888 | 2/1984 | Japan . | |

OTHER PUBLICATIONS

Chemical Abstracts vol. 94, 106225h (1981).

*Primary Examiner*—Joseph L. Schofer
*Assistant Examiner*—Wu C. Cheng
*Attorney, Agent, or Firm*—Richard P. Fennelly; Louis A. Morris

[57] ABSTRACT

Anhydride functionalized copolymers of a higher α-olefin, and an unsaturated dicarboxylic acid ester formed by copolymerization of olefin, acid ester and anhydride of the acid can be used to form imide and polar group-containing lubricant additives by reaction of the anhydride functionality in such a copolymer with an organic compound containing amino functionality and a polar group, such as hydroxy or carboxylic acid.

4 Claims, No Drawings

FUNCTIONALIZED COPOLYMER OF HIGHER α-OLEFIN AND UNSATURATED DICARBOXYLIC ACID ESTER AND DERIVATIVES THEREOF

BACKGROUND OF THE INVENTION

Copolymers of $\alpha,\beta$-unsaturated dicarboxylic acid esters and $\alpha$-olefins are useful as lubricant compositions or additives. Some recent examples of disclosures include U.S. Pat. No. 4,931,197 to H. Beck et al. and Canadian Patent No. 1,238,448 to Akzo N. V. Copolymers of this type, which are preferably butanol esters of $\alpha$-olefin-dicarboxylic acid copolymers (average molecular weight of 1200–2500) are, moreover, commercially available under the trademark KETJENLUBE from Akzo Chemicals Inc. and Akzo Chemicals b.v.

More recent U.S. Pat. No. 5,274,498 to T. A. Marolewski et al. describes and claims epoxy-functionalized copolymers of the foregoing general type which can be further functionalized containing moieties containing desirable elements for use in lubricant compositions. Included among potential elements for selection in such derivatized copolymers are nitrogen, oxygen, phosphorus and/or sulfur.

DESCRIPTION OF THE INVENTION

The present invention relates to novel functionalized copolymers comprising units derived from an $\alpha,\beta$-unsaturated dicarboxylic acid ester and an $\alpha$-olefin, as the major polymeric units in the copolymer, which also contains novel imide and polar group functionality and which is useful in lubricant compositions, for example, as an anti-wear additive.

The type of functionalized copolymer, which can be used as a starting reagent for practice of the present invention, and which is deemed a novel composition, is one which is formed by the reaction of a suitable $\alpha$-olefin, an unsaturated dicarboxylic acid ester, and a sufficient amount of an anhydride of the unsaturated dicarboxylic acid to result in the formation of an anhydride-functionalized copolymer of the $\alpha,\beta$-unsaturated dicarboxylic acid ester and $\alpha$-olefin. The amount of anhydride which is used can preferably range from about 0.1% to about 20%, based on the molar amounts of the olefin and acid ester since only a small amount of anhydride functionality is needed to serve as sites of reaction for the amino/polar group organic compound to be described below.

The types of $\alpha$-olefin monomers which can be used to form the anhydride-functionalized copolymers described above can be selected from those previously used in synthesizing the known, non-functionalized $\alpha,\beta$-unsaturated dicarboxylic acid ester/$\alpha$-olefin copolymers having lubricant utility. Preferred for use are the higher $\alpha$-olefins having from about ten to about twenty carbon atoms, particularly those of from twelve to about eighteen carbon atoms.

The $\alpha,\beta$-unsaturated dicarboxylic acid esters which can be used to synthesize the such an anhydride-functionalized copolymer can also can be selected from those previously used in synthesizing the known copolymers previously described. The esters of maleic, fumaric, citraconic, mesaconic, or itaconic acid can be chosen, with the first two being preferred. For example, esters having a straight-chain and/or branched chain monoalcohol component of from three to ten carbon atoms can be used.

In order to achieve the desired anhydride-functional copolymers which are further derivatized in accordance with the present invention, an additional anhydride of the foregoing $\alpha,\beta$-unsaturated dicarboxylic acids is employed. Maleic anhydride, citraconic anhydride, mesaconic anhydride, or itaconic anhydride can be chosen, with the first two being preferred.

While the foregoing anhydride-functionalized copolymer constitutes one novel feature of the present invention, its reaction product with an organic molecule containing amine and polar group functionality (e.g., either hydroxy functionality or carboxylic acid functionality) constitutes another novel feature of the invention. The amine group in such an organic reagent will react with the anhydride group in the previously described anhydride-functionalized copolymer forming an imide group which is deemed to confer desired dispersibility characteristics on the molecule when present in a lubricant formulation. The remaining polar functionality of such a reagent, after it has been reacted into the starting anhydride-functionalized copolymer, will enhance the affinity of the final copolymer for metallic surfaces within the engine. Amino carboxylic acids containing from about three to about twelve carbon atoms and amino alcohols containing from about two to about twelve carbon atoms are two classes of such reagent which can be selected for use.

The present invention is further illustrated by the Examples which follow.

EXAMPLE 1

This Example illustrates the incorporation of imide and carboxylic acid groups into an $\alpha$-olefin dibutylmaleate copolymer.

One hundred grams of anhydride-functionalized $\alpha$-olefin dibutylmaleate copolymer, having an acid number of 25 mg KOH/gm) was mixed with 4.6 gm of 6-aminocaproic acid thereby forming a slurry. This slurry was heated, with mixing, to 160° C. within one half hour and was then heated isothermally at 160° C. for two hours. After two hours, the reaction mixture was clear in appearance. Gas chromatographic analysis confirmed the complete reaction of 6-aminocaproic acid with the maleic anhydride. The resulting copolymer has an amber color and a higher viscosity than the initial copolymer which was reacted.

EXAMPLE 2

This Example illustrates the incorporation of imide and hydroxy functionality into an $\alpha$-olefin dibutylmaleate copolymer.

One hundred grams of the maleic anhydride-containing copolymer used in Example 1 was mixed with 4.0 gm of ethanolamine and was heated gradually to 155° C. It was held at this temperature for one hour to produce a product having a reduced acid number of 6 mg KOH/gm.

EXAMPLE 3

This is another synthesis procedure analogous to that described in Examples 1 and 2.

One hundred grams of the anhydride-functionalized $\alpha$-olefin dibutylmaleate copolymer used in Example 1 was mixed with 2 gm of 2-amino-2-ethyl-1,3-propanediol and was heated gradually to 160° C. The reaction mixture was held at this temperature for two hours to produce a high viscosity liquid having an acid number of 12 mg KOH/gm.

The foregoing Examples are presented for illustrative purposes only and should therefore not be construed in a limiting sense. The scope of protection sought is set forth in the claims which follow.

We claim:

1. A functionalized copolymer comprising units derived from reacting: (1) a higher α-olefin; and (2) an unsaturated dicarboxylic acid ester; and (3) also comprising imide and polar group functionality.

2. A copolymer as claimed in claim 1 wherein the α-olefin contains from about ten to about twenty carbon atoms and the acid ester contains from about three to about ten carbon atoms.

3. A copolymer as claimed in claim 1 wherein the polar group is carboxylic acid.

4. A copolymer as claimed in claim 2 wherein the polar group is carboxylic acid.

* * * * *